United States Patent
Childers et al.

(10) Patent No.: US 8,508,747 B2
(45) Date of Patent: Aug. 13, 2013

(54) SYSTEMS AND METHODS FOR OPTICALLY GENERATED TRIGGER MULTIPLICATION

(75) Inventors: Brooks A. Childers, Christiansburg, VA (US); Roger G. Duncan, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 709 days.

(21) Appl. No.: 12/706,796

(22) Filed: Feb. 17, 2010

(65) Prior Publication Data

US 2011/0199618 A1  Aug. 18, 2011

(51) Int. Cl.
*G01B 9/02* (2006.01)

(52) U.S. Cl.
USPC ........................................................ 356/478

(58) Field of Classification Search
USPC .................. 356/477, 478, 480, 521
See application file for complete search history.

(56) References Cited

U.S. PATENT DOCUMENTS

| | | | |
|---|---|---|---|
| 6,115,122 A | 9/2000 | Bao | |
| 6,160,826 A * | 12/2000 | Swanson et al. | 372/20 |
| 6,566,648 B1 | 5/2003 | Froggatt | |
| 7,538,860 B2 * | 5/2009 | Moore | 356/35.5 |
| 2003/0147067 A1 | 8/2003 | Woodside | |
| 2004/0046109 A1 | 3/2004 | Chen | |
| 2004/0113056 A1 | 6/2004 | Everall | |
| 2009/0122319 A1 | 5/2009 | Ronnekleiv | |

* cited by examiner

*Primary Examiner* — Tarifur Chowdhury
*Assistant Examiner* — Jonathan Hansen
(74) *Attorney, Agent, or Firm* — Law Offices of Mark L. Berrier

(57) ABSTRACT

Systems and methods for providing trigger signals in an optical interrogator, wherein multiple triggers are generated within each period of a varying reference signal, and wherein the triggers are evenly spaced according to the wavenumber of the reference signal. In one embodiment, an optical frequency domain reflectometry system provides a laser beam to a reference interferometer to produce a reference signal. This signal is passed through a 4×4 optical coupler which splits the signal into a first signal and a second signal that is 90 degrees out of phase with the first signal. These signals are converted to electrical signals, and a trigger unit generates triggers at points at which the two electrical signals have zero-crossings, and at which the magnitudes of the signals are equal. The resulting triggers remain evenly spaced within the period of the reference signals, even when the period is changed.

19 Claims, 4 Drawing Sheets

SYSTEMS AND METHODS FOR OPTICALLY GENERATED TRIGGER MULTIPLICATION

BACKGROUND

1. Field of the Invention

The invention relates generally to interferometry and more particularly to systems and methods for generating multiple triggers for each cycle of a sampling signal in an optical interrogator.

2. Related Art

The commercial success of optical fiber telecommunications has fostered the growth of optical fiber sensing applications by providing a ready supply of low cost, high quality components and test equipment. Another enabling technology for fiber sensing was the discovery of the ultraviolet (UV) photosensitivity in optical fiber. Photosensitivity allows the alteration of the internal structure of a fiber waveguide. Modification of the waveguide can be employed for a number of useful purposes, one of which is to induce a periodic modulation of the refractive index along the fiber core to create a wavelength selective reflector called a fiber Bragg grating (FBG). FBG's can be produced conveniently and very inexpensively during the fiber draw process. The period of the modulation of the refractive index determines the wavelength reflected by the FBG. After the FBG is formed, the grating period of the FBG can be physically altered by changing the mechanical load on the fiber, or by changing its temperature. By monitoring the wavelength reflected from a FBG, the FBG can be used as a transducer for both strain and temperature.

An important recent development in the use of FBGs is the use of optical frequency domain reflectometry (OFDR), which is a sensing technique that can be used to monitor FBGs or other sensors. This technique can be used to interrogate hundreds or thousands of FBG's distributed along the length of a single optical fiber. The OFDR technique has many applications where light weight, immunity to electromagnetic interference, high sensor density, and remote readout are important considerations. These applications include monitoring sensors such as FBGs, providing diagnostics on optical fiber networks and cables, including the intrinsic Rayleigh scatter of the optical fiber, monitoring the condition of aerospace structures, monitoring industrial processes, and monitoring sub-marine and oil well systems.

One of the problems with conventional OFDR systems of the type described above is that the sinusoidal reference signal provides sampling triggers only once per period, for instance at rising zero-crossings. When a reference interferometer is used for sampling, the frequency of the sampling limits the frequency of signals from the device under test that can be resolved by the system (because of the Nyquist criteria), which in turn limits the length of the device under test. If it is desired to increase the sampling frequency and thereby increase the possible length of the device under test, the path length difference of the reference interferometer must be increased. This may present practical difficulties, however. It would therefore be desirable to provide systems and methods for increasing the rate of the sampling signal without increasing the length of the reference interferometer.

SUMMARY OF THE INVENTION

This disclosure is directed to systems and methods for providing trigger signals in an optical interrogator that solve one or more of the problems discussed above. In particular, the systems and methods provide for the generation of multiple triggers within each period of a varying reference signal, where the triggers are substantially evenly spaced according to the wavenumber of the reference signal.

In one embodiment, an OFDR system is used to interrogate a sensor array that is embedded in an optical fiber. A laser illuminates both the sensor array and a reference interferometer. The reference interferometer produces a reference signal that is passed through a 4×4 optical coupler which splits the signal and provides output signals that include a first signal and a second signal that is 90 degrees out of phase with the first signal. Optical detectors are used to convert these optical signals to electrical signals. A trigger unit then detects points at which the two electrical signals have zero-crossings, and at which the magnitudes of the signals are equal. This produces eight triggers per period of the reference signals, rather than the single trigger that is normally produced at the rising zero-crossing of the reference signal. Further, because the triggers are generated from events that correspond to fixed positions within the period of the reference signals, the triggers remain approximately evenly spaced within the period of the reference signals, even when the period changes as a result of non-linearities in the sweeping of the frequency of the laser.

An apparatus for triggering uniform wavenumber sampling in an optical frequency domain reflectometer system. The apparatus includes an optical coupler, at least one reference optical detector, and a trigger unit. The optical coupler is configured to receive a reference optical signal from a reference interferometer and to provide at least one output optical signal having the same period as the reference optical signal. The reference optical detector is configured to receive the output optical signal and to convert this signal into at least one electrical signal having the same period as the output optical signal. The trigger unit is configured to receive the electrical signals and to generate a trigger signal that contains more than one trigger per period of the electrical signals, where the triggers have uniform wavenumber spacing. In one embodiment, the optical coupler is configured to split the reference optical signal into two optical signals that are 90 degrees out of phase with each other (as are the two resulting electrical signals). The optical coupler may be, for example, a 4×4 optical coupler. The trigger unit may be configured to generate triggers at zero-crossings of the first and second electrical signals and at times at which the first and second electrical signals have equal magnitudes. For instance, the trigger unit may include four comparator-differentiator pairs and a summing unit, where a first comparator-differentiator pair receives the first and second electrical signals as inputs, a second comparator-differentiator pair receives the first electrical signal and an inverse of the second electrical signal as inputs, a third comparator-differentiator pair receives the first electrical signal and ground as inputs, and a fourth comparator-differentiator pair receives the second electrical signal and ground as inputs. The output of each comparator-differentiator pair can then be provided as an input to the summing unit, the output of which is the trigger signal. The apparatus may also include a reference interferometer and a laser, where the reference interferometer is configured to receive a laser light beam from the laser and to produce the reference optical signal.

Another embodiment comprises a method for triggering uniform wavenumber sampling in an optical frequency domain reflectometer system. The method includes providing a reference optical signal, converting the reference optical signal into at least one electrical signal having the same period as the reference optical signal, and generating a trigger signal based on the at least one electrical signal, where the trigger signal contains more than one trigger per period of the at least one electrical signal, and where the triggers have uniform wavenumber spacing. The reference optical signal may be generated by providing a laser beam to a reference interferometer, the output of which is passed through a 4×4 optical coupler to produce a pair of optical signals that are 90 degrees out of phase with each other. These optical signals are then converted by optical detectors to electrical signals that are 90 degrees out of phase. The triggers may then be generated at zero-crossings of the two electrical signals and at times at which the two electrical signals have equal magnitudes.

Another embodiment comprises an OFDR system that includes a laser and a first optical coupler (e.g., a 4×4 coupler) that couples the laser to a reference interferometer. The reference interferometer uses the laser light beam to produce a reference optical signal, which is returned to the first optical coupler. Reference optical detectors receive the returned output optical signals (which are 90 out of phase with each other) and convert them into corresponding electrical signals having the same period as the output optical signals. A trigger unit receives the electrical signals and generates a trigger signal that contains more than one trigger per period of the at least one electrical signal. The triggers have uniform wavenumber spacing. For instance, the trigger unit may use comparator-differentiator pairs to generate triggers corresponding to zero-crossings of the first and second electrical signals and times at which the first and second electrical signals have equal magnitudes. The system also includes a sensor array that receives the beam from the laser and produces an optical sensor signal. A sensor array optical detector receives the optical sensor signal and the trigger signal. The sensor array optical detector samples the optical sensor signal in response to occurrences of the triggers in the trigger signal. The sensor array may be a sensor array interferometer. The sensor array interferometer may, for example, include a 2×2 optical coupler and a plurality of selectively reflective sensors, such as fiber Bragg gratings. A first port of the 2×2 optical coupler receives the laser light beam, a second port of the 2×2 optical coupler is coupled to a first optical fiber that terminates at a broadband reflector, and a third port of the 2×2 optical coupler is coupled to a second optical fiber that incorporates the sensors.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
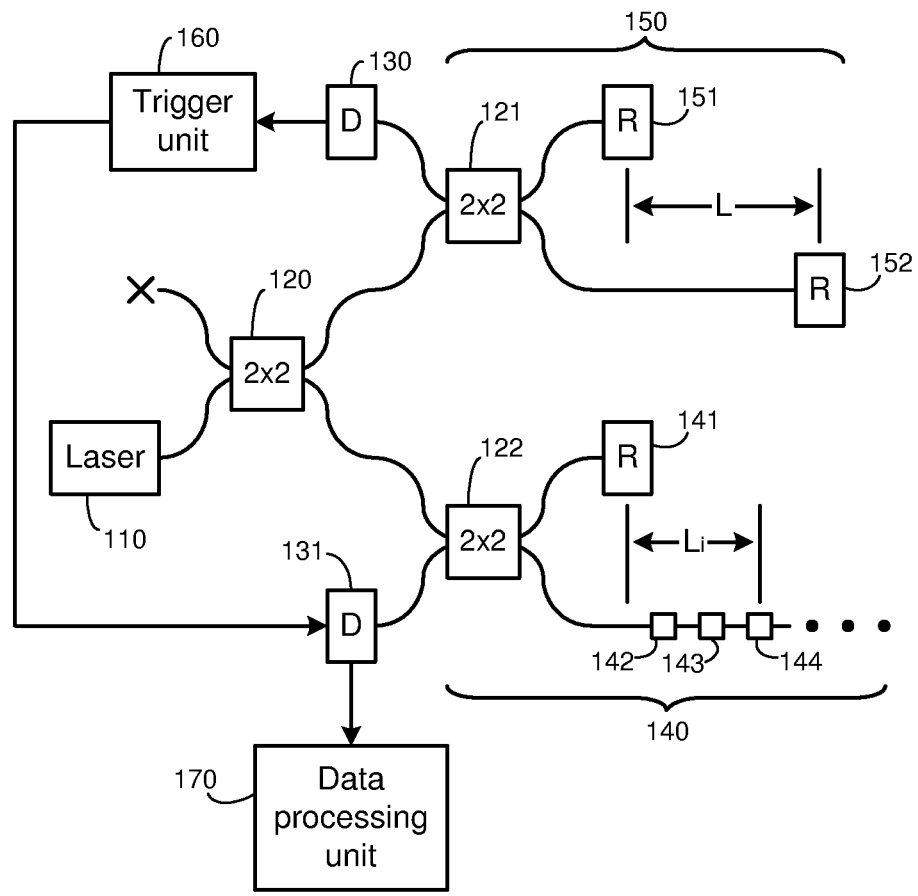
FIG. 1 is a diagram illustrating a basic OFDR system in accordance with the prior art.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for providing trigger signals in an optical interrogator, wherein multiple triggers are generated within each period of a varying reference signal, and wherein the triggers are evenly spaced according to the wavenumber of the reference signal.

In one embodiment, an OFDR system is used to interrogate a sensor array that is embedded in an optical fiber. A laser provides a beam to both the sensor array and a reference interferometer. The reference interferometer produces a reference signal that is passed through a 4×4 optical coupler which splits the signal and provides output signals that are 90 degrees out of phase with each other. Optical detectors are used to convert these optical signals to electrical signals. A trigger unit then detects points at which the two electrical signals have zero-crossings, and at which the magnitudes of the signals are equal. This produces eight triggers per period of the reference signals, rather than the single trigger that is normally produced at the rising zero-crossing of the reference signal. Further, because the triggers are generated from events that correspond to fixed positions within the period of the reference signals, the triggers remain evenly spaced within the period of the reference signals, even when the period changes as a result of sweeping the frequency of the laser.

OFDR is a technique that can be used to monitor, or interrogate, sensors such as FBGs that have reflectivity which is wavelength-dependent. FBGs are devices that utilize periodic modulations of the refractive index of an optical fiber to achieve wavelength-selective reflection. The period of the modulation determines the wavelength that is reflected, but the period of the modulation (hence the wavelength reflected) can be altered by changing the mechanical load on the fiber or the temperature of the fiber. The FBG can be used as a sensor for strain and/or temperature by monitoring the wavelength that is reflected by the FBG.

Because of the availability of techniques such as OFDR, many FBGs (e.g., hundreds or even thousands) can be distributed along the length of a single fiber. In one configuration, OFDR system generates a sampling signal, for example, by using a frequency-swept laser with an in-fiber reference interferometer. The light from the laser is also provided to the fiber that incorporates the FBGs. Each of the FBGs effectively provides an interferometer output which is sampled according to the sampling signal produced by the reference interferometer. The light reflected by each FBG is modulated by a unique frequency that is dependent upon the FBG's location along the length of the fiber.

A basic, conventional OFDR system is shown in FIG. 1. This system includes a wavelength-tunable laser 110, three 2-by-2 optical couplers 120-122, two photodiode detectors 130-131, an FBG-array-based interferometer 140, and an in-fiber interferometer 150. The laser light is split by coupler 120 and travels to couplers 121 and 122. The port of coupler 120 that is not used is terminated (as noted in the figure by an "X").

Each of the 2-by-2 optical couplers splits the light that passes through the coupler, so light entering one side of the coupler is split and output on the two ports on the opposite side. The coupler works the same in both directions. Coupler 121 is used to form an in-fiber interferometer with the light reflected from reflectors 151 and 152. This light is detected by a detector 130, such a photodiode. This reference interferometer has an optical path length difference of 2nL, where n is the effective refractive index of the fiber and L is the path difference of the two paths through the interferometer (from coupler 121 to reflector 151, and from coupler 121 to reflector 152).

Coupler 122 is used to form what is effectively a sequence of similar overlapping interferometers. The first path of each interferometer is formed between coupler 122 and reflector 141. The second path of each interferometer is formed between coupler 122 and the respective one of the FBGs (e.g., 142, 143 or 144). The light reflected from reflector 141 and each grating (142-144) is detected by detector 131.

Figure 2:
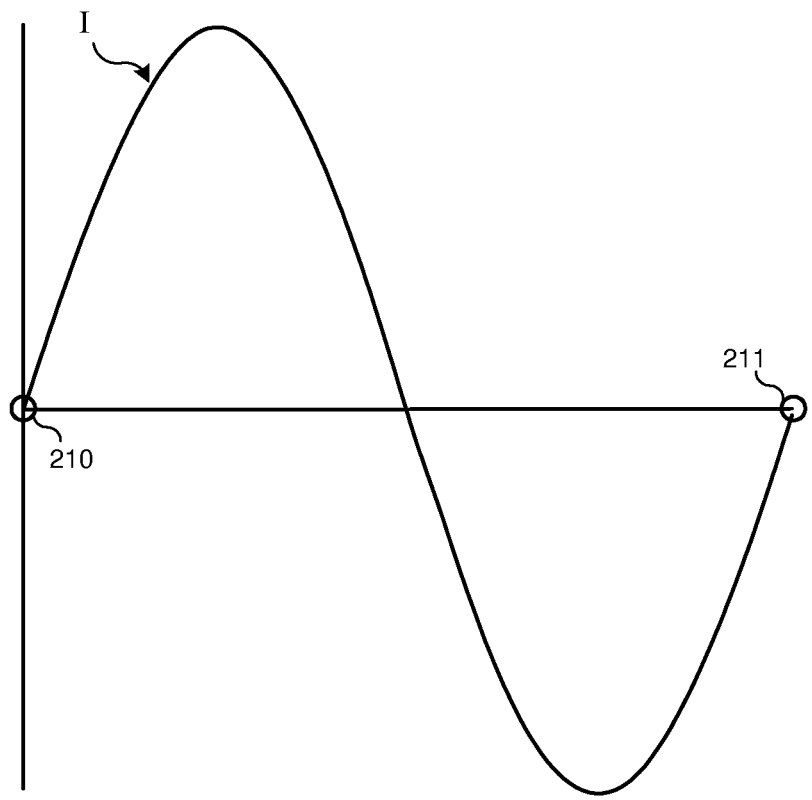
FIG. 2 is a diagram illustrating a reference optical signal and a trigger signal that includes triggers at rising zero-crossings of the reference optical signal.
Figure 2:
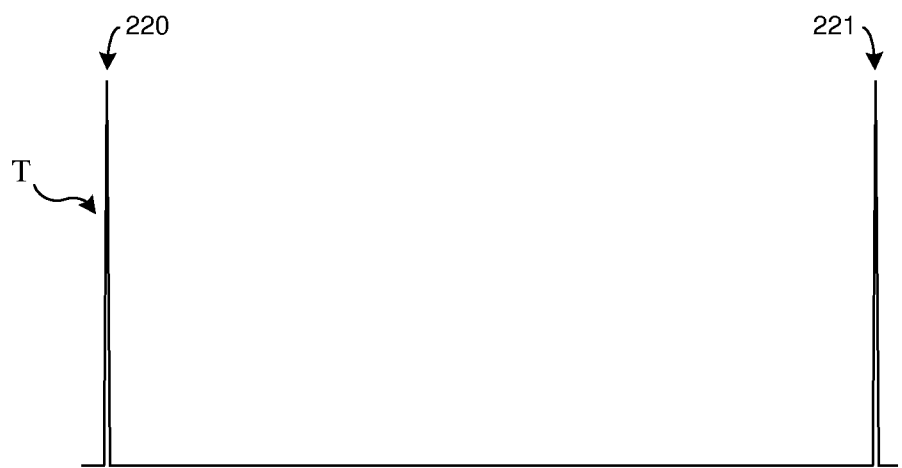

The signal detected by detector 130 is sinusoidal. The phase of this signal is a linear function of the wavenumber of the laser. The signal detected by detector 130 is converted to an electrical signal by trigger unit 160. This signal is used to trigger sampling of the sensor signals arriving at detector 131. Typically, the rising zero-crossings of the sinusoidal signal detected by detector 130 are used as triggers. This is shown in FIG. 2. The reference signal I detected by detector 130 is depicted at the top of FIG. 2. The trigger signal T produced by trigger unit 160 is shown at the bottom of the figure. As indicated in this figure, rising zero-crossings 210 and 211 are detected by trigger unit 160, which generates corresponding triggers 220 and 221 in the trigger signal.

The data detected by detector 131 is forwarded to a data processing unit 170. Using the signal detected by detector 130 to trigger sampling of the optical signals arriving at detector 131 provides high resolution, and also provides uniform wavenumber sampling of these signals. It should be noted that, because the frequency of the laser is swept, time-synchronous sampling may not provide uniform sampling, if the tuning is non-linear with respect to time. The high-resolution, uniform sampling allows discrete Fourier analysis of the signals received at detector 131.

The system of FIG. 1 can easily be extended to include additional sensor modules. Each additional sensor module may be constructed in the same manner as the first, including a detector (e.g., 131) and a sensor-array-based interferometer (e.g., 140). If optical coupler 120 is changed, for example, to a 4×4 coupler, the light from laser 110 can be provided to one or two additional sensor modules. The detector of each additional sensor module can be triggered using the same trigger signal generated by trigger unit 160, and the data can be provided to and processed by the same data processing unit As noted above, the light reflected by each FBG is modulated by a unique frequency that is dependent upon the FBG's location along the length of the fiber. The farther an FBG is located from the coupler, the higher the frequency associated with the FBG. In order to increase the length of the fiber (hence the distance of the FBGs from the coupler), the system of FIG. 1 must also increase the path length difference of the reference interferometer. Because it may not be practical or convenient to increase the length of the reference interferometer, it may be preferable to maintain the length of the reference interferometer and multiply the triggers that are generated based on the reference signal detected by detector 130.

The OFDR signals are driven by the wavelength tuning of the laser. As the laser is tuned, the signal at detector 130 is given by $$D1 = \cos(k2nL) \quad (1)$$

The frequency of this signal is proportional to L, the interferometer path length difference. The constant k is the wavenumber of the light, and is related to the light's wavelength, λ, by $$k = 2\pi/\lambda \quad (2)$$

The interferometer cycles once for a wavenumber change, Δk, of $$\Delta k = \pi/n\lambda \quad (3)$$

This is a constant. The interferometer therefore cycles linearly as a function of wavenumber. The positive-going zero crossing of the signal at detectcor 130 are used to trigger the sampling of the signal at detector 131. This guarantees that the signal at 131 is sampled at the constant wavenumber interval given by Equation (3).

The signals corresponding to all of the FBGs are present at detector 131. Each of these signals is similar to the signal at detector 130, bur the response of each FBG is limited to the narrow wavelength range, or spectrum, over which it reflects. In other words, the individual interferometer corresponding to each FBG can only produce an output signal when it is reflecting light. The signal at detector 131 is the sum of these individual interferometer responses, so the signal at detector 131 can be written as $$D2 = \sum_i R_i \cos(k2nL_i) \quad (4)$$

where Ri is the spectrum of the i'th grating and Li is the path length difference of the corresponding i'th interferometer. This equation shows, as noted above, that the spectrum of each grating is modulated by a signal with a unique frequency which is governed by the grating's position, Li, in the fiber. By bandpass filtering around a specific frequency (location) via fast Fourier transform, the spectrum of each grating can be independently measured and strain or temperature inferred.

Figure 3:
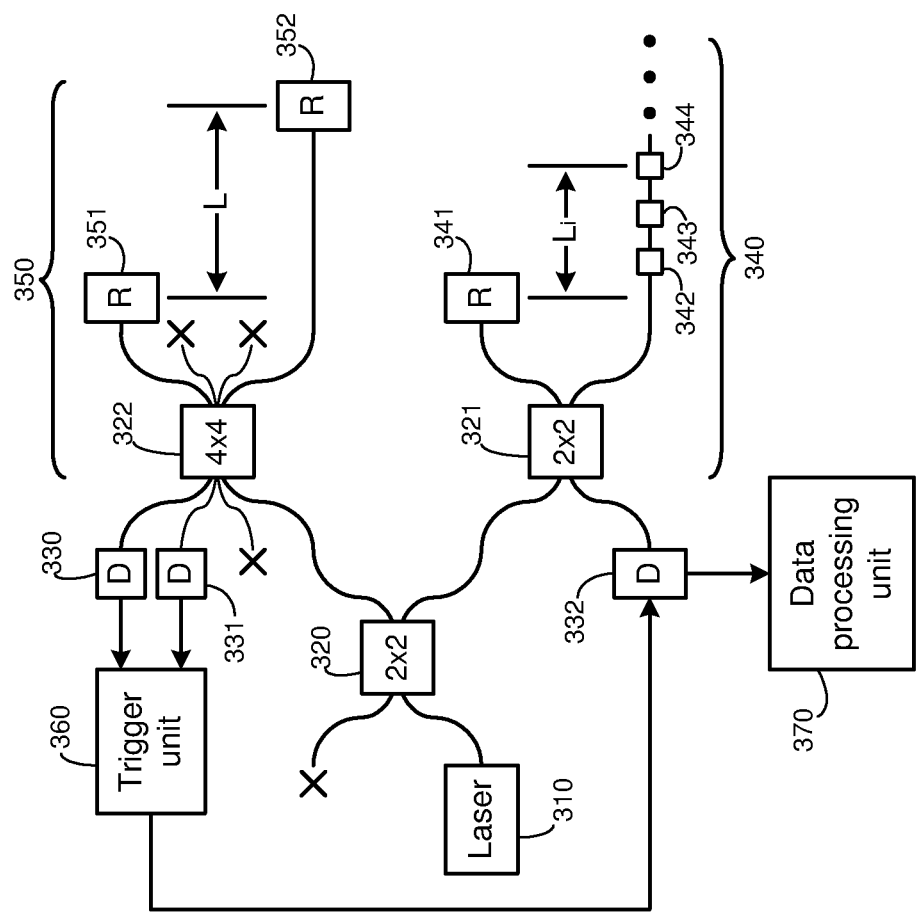
FIG. 3 is a diagram illustrating an OFDR system that generates multiple triggers per period of a reference optical signal in accordance with one embodiment.

Referring to FIG. 3, an OFDR system that provides multiple triggers per period of the reference interferometer signal is shown. This system includes a wavelength-tunable laser 310, three optical couplers 320-322, three photodiode detectors 330-332, an FBG-array-based interferometer 340, and an in-fiber interferometer 350.

As in the system of FIG. 1, the laser light is split by coupler 320 and travels to couplers 321 and 322. Couplers 320 and 321 are 2×2 couplers. Coupler 322, however, is a 4×4 coupler, so light entering one side of this coupler is split and output on four ports on the opposite side. Two of the ports on the right side of coupler 322 are connected to optical fibers that terminate at broadband reflectors 351 and 352, forming a reference interferometer which is essentially the same as the reference interferometer of FIG. 1. The reference interferometer of FIG. 3 has an optical path length difference of 2nL, where n is the effective refractive index of the fiber and L is the path difference of the two paths through the interferometer. In the system of FIG. 3, however, the interferometer's output signal is returned to two detectors, 330 and 331, as well as to port 325, which is unused. The output signal received by detector 330 is 90 degrees out of phase with the signal received by detector 331. As in FIG. 1, coupler 321 is used to form effectively overlapping interferometers 340. The light reflected from reflector 341 and each FBG (342-344) is detected by detector 332.

The signals detected by detectors 330 and 331 are sinusoidal and have phases that are linear functions of the wavenumber of the laser. As noted above, the signals are 90 degrees out of phase. The optical signals detected by detectors 330 and 331 are converted to electrical signals by trigger unit 360. Trigger unit 360 makes several comparisons of these electrical signals with each other and with reference voltages, and generates trigger signals based on the comparisons. The trigger signals are used to trigger sampling of the optical signals arriving at detector 332. The data detected by detector 332 is forwarded to a data processing unit 370, which processes the data to determine the wavelength of the light reflected from each of the FBGs.

Figure 4:
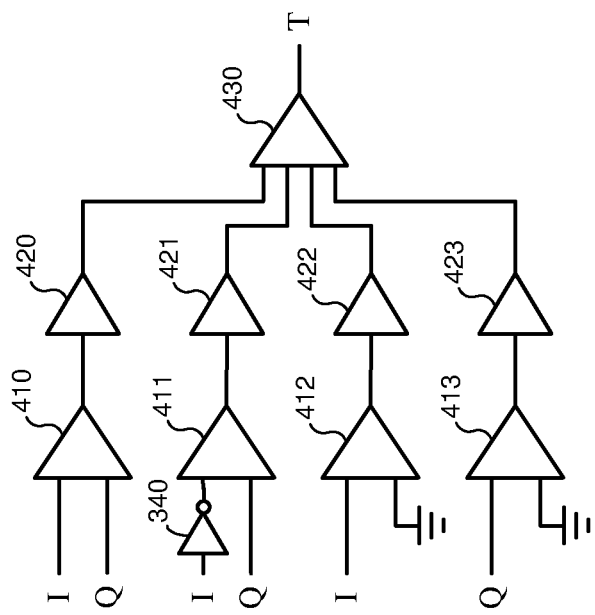
FIG. 4 is a diagram illustrating an exemplary structure for a trigger unit as may be used in the system of FIG. 3.

In one embodiment, trigger unit 360 is configured to generate eight trigger pulses uniformly distributed throughout the period of the sinusoidal optical signals. An exemplary structure for the trigger unit is shown in FIG. 4. The trigger unit of FIG. 4 receives the electrical signals, I and Q, which correspond to the optical signals received by detectors 330 and 331, and generates a trigger signal, T, which is used to trigger sampling at detector 332.

The trigger unit identifies zero-crossings (both rising and falling) of signals I and Q, and also identifies points at which the magnitudes of I and Q are equal. The zero-crossings occur every 90 degrees during the period of the signals. Similarly, the magnitudes of the signals are equal every 90 degrees during the period of the signals, but these occur with a 45 degree phase difference from the zero-crossings. When combined, these events occur every 45 degrees throughout the period of the signals, resulting in eight evenly spaced trigger events during the period of the signals.

Referring to FIG. 4, the trigger unit includes a set of comparators 410-413, a set of differentiators 420-423, and a summing unit 430. In this embodiment, comparators 410-413 comprise Schmidt triggers with negligible hysteresis. Comparators 410-411 and differentiators 420-421 are used to produce triggers corresponding to points at which the optical signals have equal magnitude, while comparators 412-413 and differentiators 422-423 are used to produce triggers corresponding to zero-crossings.

Comparator 410 receives signals I and Q as inputs. When I is greater than Q, the output of comparator 410 is high. When I is less than Q, the output of comparator 410 is low. Thus, the output of comparator 410 transitions between high and low whenever I and Q are equal. The output of comparator 410 is input to differentiator 420. Differentiator 420 generates an output pulse whenever there is a transition in the input signal. Consequently, differentiator 420 produces an output pulse whenever I and Q are equal. The output of differentiator 420 is then provided as an input to summing unit 430. Comparator 411 receives signal Q and the inverse of signal I as inputs. Comparator 411 could alternatively receive I and the inverse of Q. When signals I and Q are equal in magnitude, but opposite in sign, the output of comparator 411 transitions between high and low. The output of comparator 411 is provided as an input to differentiator 421, which converts each transition of the input signal to a pulse at the output of the differentiator. The output the differentiator 421 is provided as an input to summing unit 430.

Signal I is provided as an input to comparator 412. The other input of comparator 412 is tied to ground. When signal I is greater than zero, the output of comparator 412 is high, and when the signal is less than zero, the output of the comparator is low. The output of comparator 412 transitions between high and low whenever signal I crosses zero. The output of comparator 412 is provided as an input to differentiator 422. Differentiator 422 produces a pulse at its output whenever there is a transition between high and low in the input signal. The output of differentiator 422 is provided as an input to summing unit 430. Signal Q is provided as a first input to comparator 413. The second input of comparator 413 is tied to ground, so that the output of the comparator transitions between high and low whenever signal Q crosses zero. The output of comparator 413 is provided as an input to differentiator 423. Differentiator 423 produces an output pulse whenever there is a high-low or low-high transition in the input signal, so in output pulse is generated for each zero-crossing of signal Q.

As noted above, the outputs of differentiators 420-423 are provided as inputs to summing unit 430. Each of these inputs is low, except when a pulse is generated for the corresponding trigger conditions (i.e., I=Q for differentiator 420, I=−Q for differentiator 421, I=0 for differentiator 422, and Q=0 for differentiator 423). Consequently, the output of summing unit 430 is low, except when a pulse is received from one of differentiators 420-423.

Figure 5:
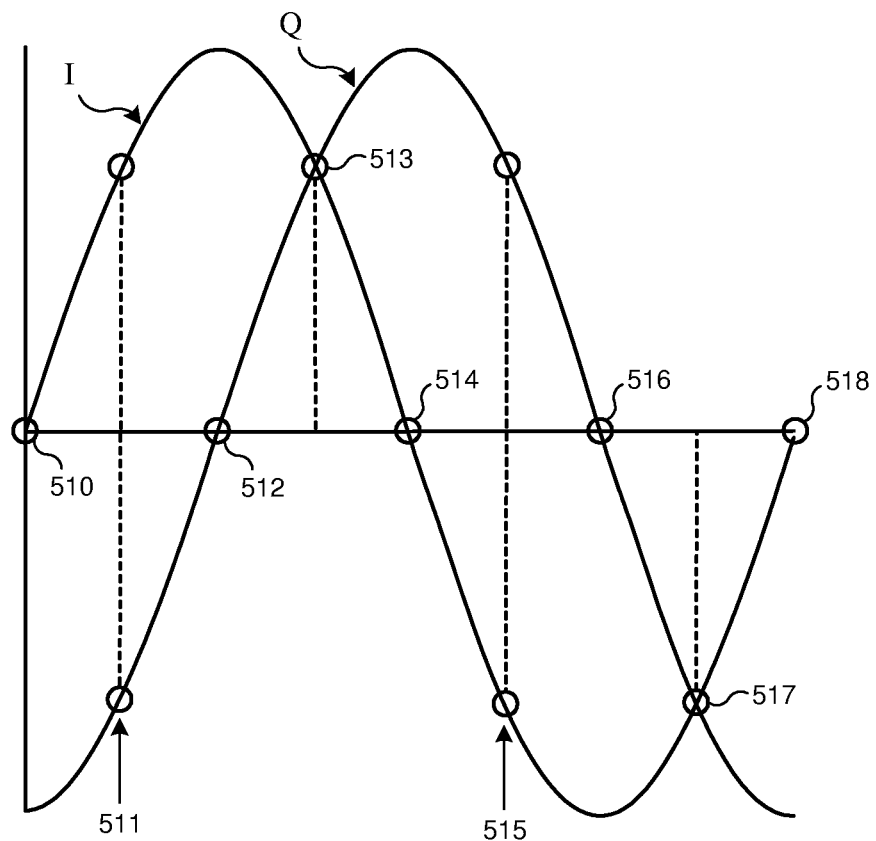
FIG. 5 is a diagram illustrating a pair of reference optical signals and a trigger signal that includes multiple triggers per period of the reference optical signals as generated by the trigger unit of FIG. 4.
Figure 5:
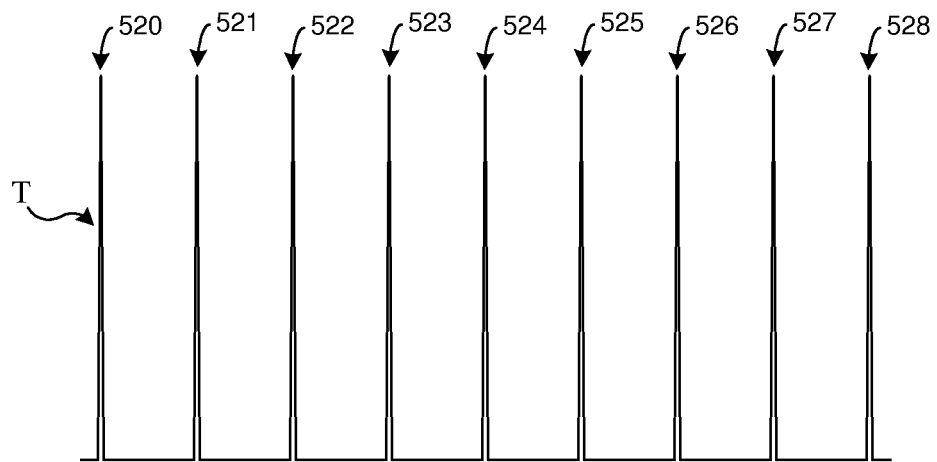

Referring to FIG. 5, a diagram illustrating the relationship between signals I and Q and the output of the trigger unit is shown. In the upper part of the figure, signals I and Q are depicted. The output of the trigger unit is shown in the lower part of the figure. Signals I and Q are the electrical signals that are output by detectors 330 and 331. Signals I and Q track the optical signals that are produced by reference interferometer 350 and optical coupler 322—they have the same period, phase and waveform. When signals I and Q are input to the trigger unit shown in FIG. 4, the trigger unit produces a trigger signal, T, as shown at the bottom of FIG. 5. The pulses (triggers) in trigger signal T correspond to the events detected by the comparator-differentiator pairs in the trigger unit. Comparator-differentiator pair 410/420 detects the points at which I and Q are equal (e.g., 513, 517) and generates corresponding triggers (e.g., 523, 527). Comparator-differentiator pair 411/421 detects the points at which I and Q are equal in magnitude, but opposite in sign (e.g., 511, 515) and generates corresponding triggers (e.g., 521, 525). Comparator-differentiator pair 412/422 detects the zero-crossings of signal I (e.g., 510, 514, 518) and generates triggers for these events (e.g., 520, 524, 528). Comparator-differentiator pair 413/423 detects zero-crossings of signal Q (e.g., 512, 516) and generates the corresponding triggers (e.g., 522, 526).

Using the signal detected by detector 330 to trigger sampling of the optical signals arriving at detector 331 provides higher resolution than conventional sampling based on rising zero-crossings, and also provides uniform wavenumber sampling, even when the frequency of the laser is swept. It should be noted that, because the frequency of the laser is swept, time-synchronous sampling would not provide uniform sampling. The high-resolution, uniform sampling allows discrete Fourier analysis of the signals received at detector 331.

The embodiment of FIGS. 3-5 is intended to be exemplary. It is contemplated that there may be many alternative embodiments which incorporate variations of the elements described above and still fall within the scope of the invention. For instance, while the foregoing embodiment generates eight triggers per period of the reference signal, other embodiments may generate less (e.g., two or four) or more (e.g., 16) triggers per period. Further, while the foregoing embodiment employs a particular arrangement of electronic components (comparators, differentiators, summing unit) to generate the triggers in the trigger signal, it should be understood that many alternative components and arrangements may be used to achieve the desired result (triggers that provide uniform wavenumber sampling). Such alternative embodiments are believed to be within the scope of the present disclosure. Still further, while the embodiments above are used in connection with a sensor array that employs FBGs, the disclosed systems and methods for optical interrogation may be useful with other types of sensors or devices, and are not limited to use with FBGs.

Those of skill will further appreciate that the various illustrative logical blocks, modules, circuits, and algorithm steps described in connection with the embodiments disclosed herein may be implemented as electronic hardware, computer software (including firmware,) or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Similarly, the particular hardware or software components that are chosen to implement the described functionality may be selected to achieve specific design goals. Those of skill in the art may implement the described functionality in varying ways for each particular application, but such implementation decisions should not be interpreted as causing a departure from the scope of the present invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. An apparatus for triggering uniform wavenumber sampling in an optical frequency domain reflectometry system, the apparatus comprising:
    an optical coupler configured to receive a reference optical signal from a reference interferometer and to provide at least one output optical signal having the same period as the reference optical signal;
    at least one reference optical detector configured to receive the at least one output optical signal and to convert the output optical signal into at least one electrical signal having the same period as the output optical signal; and
    a trigger unit configured to receive the at least one electrical signal and to generate a trigger signal that contains more than one trigger per period of the at least one electrical signal, wherein the triggers have uniform wavenumber spacing,
    wherein the optical coupler is configured to split the reference optical signal into first and second output optical signals, wherein the second output optical signal is 90 degrees out of phase from the first output optical signal, and wherein the at least one reference optical detector comprises first and second reference optical detectors that are configured to convert the first and second output optical signals into first and second electrical signals, wherein the second electrical signal is 90 degrees out of phase from the first electrical signal.

2. The apparatus of claim 1, wherein the optical coupler comprises a 4×4 optical coupler.

3. The apparatus of claim 1, wherein the trigger unit is configured to generate triggers at zero-crossings of the first and second electrical signals and at times at which the first and second electrical signals have equal magnitudes.

4. The apparatus of claim 3, wherein the trigger unit comprises four comparator-differentiator pairs and a summing unit, wherein a first comparator-differentiator pair receives the first and second electrical signals as inputs, a second comparator-differentiator pair receives the first electrical signal and an inverse of the second electrical signal as inputs, a third comparator-differentiator pair receives the first electrical signal and ground as inputs, and a fourth comparator-differentiator pair receives the second electrical signal and ground as inputs, and wherein an output of each comparator-differentiator pair is provided as an input to the summing unit, and wherein an output of the summing unit is the trigger signal.

5. The apparatus of claim 1, further comprising the reference interferometer, wherein the reference interferometer is configured to receive a laser light beam and to produce the reference optical signal.

6. The apparatus of claim 1, further comprising a laser coupled to the reference interferometer, wherein the laser is configured to produce the laser light beam and to provide the laser light beam to the reference interferometer.

7. A method for triggering uniform wavenumber sampling in an optical frequency domain reflectometry system, the method comprising:
    providing a reference optical signal having a period that varies with a wavenumber of a laser light beam that interrogates a sensor array;
    converting the reference optical signal into at least one electrical signal having the same period as the reference optical signal; and
    generating a trigger signal based on the at least one electrical signal, wherein the trigger signal contains more than one trigger per period of the at least one electrical signal, and wherein the triggers have uniform wavenumber spacing,
    wherein converting the reference optical signal into the at least one electrical signal comprises splitting the reference optical signal into first and second output optical signals, wherein the second output optical signal is 90 degrees out of phase from the first output optical signal, and converting the first and second output optical signals into first and second electrical signals, wherein the second electrical signal is 90 degrees out of phase from the first electrical signal.

8. The method of claim 7, wherein splitting the reference optical signal into the first and second output optical signals comprises passing the reference optical signal through a 4×4 optical coupler.

9. The method of claim 7, wherein the trigger signal includes triggers at zero-crossings of the first and second electrical signals and at times at which the first and second electrical signals have equal magnitudes.

10. The method of claim 7, wherein providing the reference optical signal comprises providing the laser beam to a reference interferometer, wherein the reference interferometer produces the reference optical signal.

11. The method of claim 10, further comprising providing the laser light beam to a sensor array, wherein the sensor array produces an optical sensor signal, and sampling the optical sensor signal in response to occurrences of the triggers in the trigger signal.

12. The method of claim 11, further comprising sweeping a wavelength of the laser light beam.

13. An optical frequency domain reflectometry system comprising:
   a laser configured to produce a laser light beam;
   a first optical coupler configured to receive the laser light beam from the laser;
   a reference interferometer configured to receive the laser light beam from the first optical coupler and to produce a reference optical signal, wherein the reference interferometer is configured to provide the reference optical signal to the first optical coupler;
   wherein the first optical coupler is configured to receive the reference optical signal and to provide at least one output optical signal having the same period as the reference optical signal;
   at least one reference optical detector configured to receive the at least one output optical signal and to convert the output optical signal into at least one electrical signal having the same period as the output optical signal;
   a trigger unit configured to receive the at least one electrical signal and to generate a trigger signal that contains more than one trigger per period of the at least one electrical signal, wherein the triggers have uniform wavenumber spacing;
   a sensor array coupled to the laser and configured to receive the laser light beam, wherein the sensor array is configured to produce an optical sensor signal; and
   a sensor array optical detector configured to receive the optical sensor signal, wherein the sensor array optical detector is configured to receive the trigger signal and to sample the optical sensor signal in response to occurrences of the triggers in the trigger signal,
   wherein the first optical coupler is configured to split the reference optical signal into first and second output optical signals, wherein the second output optical signal is 90 degrees out of phase from the first output optical signal, and wherein the at least one optical detector comprises first and second optical detectors that are configured to convert the first and second output optical signals into first and second electrical signals, wherein the second electrical signal is 90 degrees out of phase from the first electrical signal.

14. The system of claim 13, wherein the first optical coupler comprises a 4×4 optical coupler.

15. The system of claim 13, wherein the trigger unit is configured to generate triggers at zero-crossings of the first and second electrical signals and at times at which the first and second electrical signals have equal magnitudes.

16. The system of claim 15, wherein the trigger unit comprises four comparator-differentiator pairs and a summing unit, wherein a first comparator-differentiator pair receives the first and second electrical signals as inputs, a second comparator-differentiator pair receives the first electrical signal and an inverse of the second electrical signal as inputs, a third comparator-differentiator pair receives the first electrical signal and ground as inputs, and a fourth comparator-differentiator pair receives the second electrical signal and ground as inputs, and wherein an output of each comparator-differentiator pair is provided as an input to the summing unit, and wherein an output of the summing unit is the trigger signal.

17. The system of claim 13, wherein the sensor array comprises a sensor array interferometer.

18. The system of claim 17, wherein the sensor array interferometer comprises a 2×2 optical coupler, wherein a first port of the 2×2 optical coupler is coupled to the laser to receive the laser beam, wherein a second port of the 2×2 optical coupler is coupled to a first optical fiber that terminates at a broadband reflector, and wherein a third port of the 2×2 optical coupler is coupled to a second optical fiber that incorporates a plurality of selectively reflective sensors along the length of the second optical fiber.

19. The system of claim 18, wherein the selectively reflective sensors comprise fiber Bragg gratings.

* * * * *